US009663125B2

(12) United States Patent
Myokei

(10) Patent No.: US 9,663,125 B2
(45) Date of Patent: May 30, 2017

(54) TRAIN CONTROL SYSTEM

(71) Applicant: THE NIPPON SIGNAL CO., LTD., Tokyo (JP)

(72) Inventor: Kenichi Myokei, Kuki (JP)

(73) Assignee: THE NIPPON SIGNAL CO., LTD., Tokyo (JP)

( * ) Notice: Subject to any disclaimer, the term of this patent is extended or adjusted under 35 U.S.C. 154(b) by 0 days.

(21) Appl. No.: 14/228,143

(22) Filed: Mar. 27, 2014

(65) Prior Publication Data

US 2014/0214247 A1 Jul. 31, 2014

Related U.S. Application Data

(63) Continuation of application No. PCT/JP2012/074287, filed on Sep. 21, 2012.

(30) Foreign Application Priority Data

Sep. 30, 2011 (JP) ................................ 2011-218252

(51) Int. Cl.
*G05D 1/00* (2006.01)
*G05D 3/00* (2006.01)
(Continued)

(52) U.S. Cl.
CPC ............... *B61L 25/02* (2013.01); *B61L 3/125* (2013.01); *B61L 15/0063* (2013.01); *B61L 25/026* (2013.01); *Y02T 10/7258* (2013.01)

(58) Field of Classification Search
CPC combination set(s) only.
See application file for complete search history.

(56) References Cited

U.S. PATENT DOCUMENTS 5,364,047 A * 11/1994 Petit ........................ B61L 3/008 246/122 R
5,398,894 A * 3/1995 Pascoe .................... B61L 21/10 246/122 R
(Continued)

FOREIGN PATENT DOCUMENTS

CN 1819942 A 8/2006
EP 1975031 A2 10/2008
(Continued)

OTHER PUBLICATIONS

Jeong, et al., "A drive-less oparating by communication based train control," electrical Machines and Systems, Oct. 2008, pp. 237-242.
(Continued)

*Primary Examiner* — Bhavesh V Amin
(74) *Attorney, Agent, or Firm* — McDermott Will & Emery LLP

(57) ABSTRACT

A train control system of the present invention capable of controlling a train in a plurality of drive modes by a single on-board device, includes an on-board device 4 mounted on a train 2 traveling on a predetermined track 1; a continuous ATP processing unit 11 and an intermittent ATP processing unit 10 that is provided in the on-board device 4 and simultaneously performs processes in a continuous ATP drive mode by a continuous ATP system and an intermittent ATP drive mode by an intermittent ATP system; and a drive mode determining unit 12 that selects either one of process results to be used in a travel control, of the continuous ATP processing unit 11 and the intermittent ATP processing unit 10.

6 Claims, 3 Drawing Sheets

(51) Int. Cl.

| | |
|---|---|
| ***G06F 7/00*** | (2006.01) |
| ***G06F 17/00*** | (2006.01) |
| ***B61L 25/02*** | (2006.01) |
| ***B61L 15/00*** | (2006.01) |
| ***B61L 3/12*** | (2006.01) |

(56) References Cited

U.S. PATENT DOCUMENTS

| | | | | |
|---|---|---|---|---|
| 5,947,423 | A * | 9/1999 | Clifton | B61L 3/225 246/167 R |
| 5,978,718 | A * | 11/1999 | Kull | B61L 3/008 246/167 R |
| 5,995,881 | A * | 11/1999 | Kull | B61L 3/008 246/182 A |
| 2005/0133673 | A1* | 6/2005 | Sugita | B61L 3/125 246/167 R |
| 2014/0214247 | A1* | 7/2014 | Myokei | B61L 15/0063 701/19 |

FOREIGN PATENT DOCUMENTS

| | | | |
|---|---|---|---|
| JP | 56-094901 | A | 7/1981 |
| JP | H 09-48349 | A | 2/1997 |
| JP | 2001-258107 | A | 9/2001 |
| JP | 2002-240715 | A | 8/2002 |
| JP | 2004-359156 | A | 12/2004 |
| JP | 2005-312094 | A | 11/2005 |
| JP | 2005-323445 | A | 11/2005 |
| JP | 2007-331629 | A | 12/2007 |
| JP | 2008-080981 | A | 4/2008 |
| JP | 2010-259194 | A | 11/2010 |
| JP | 2011-193632 | A | 9/2011 |

OTHER PUBLICATIONS

Coenraad, “Intermittent and Continuous Automatic Train Protection,” Railway Signalling and Control Systems Course 2006, Jan. 2006, pp. 94-131.

Extended European Search Report dated Aug. 4, 2015, which issued in European Application No. 12836272.0.

Japanese Patent Office Communication Mailed May 26, 2015 in Application No. 2011-218252, with English language translation thereof.

Chinese Office Action dated Sep. 30, 2015, which issued in Chinese Application No. 201280047729.3, together with English language translation thereof.

Chinese Office Action dated Aug. 2, 2016, which issued in Chinese Application No. 201280047729.3, together with English language translation thereof.

* cited by examiner

TRAIN CONTROL SYSTEM

This application is a continuation application of PCT/JP2012/074287, filed on Sep. 21, 2012.

BACKGROUND OF THE INVENTION

1. Field of the Invention

The present invention relates to a train control system, and more specifically, relates to a train control system capable of controlling a train in a plurality of drive modes by a single on-board device.

2. Description of Related Art

Conventionally, in a train control system using a so-called radio distance measurement system, a vehicle radio set is mounted on a train, a wireless network is formed between the vehicle radio set and a plurality of wayside radio sets which is spatially separated and disposed along a wayside of a track on which the train travels, and then, wireless propagation delay (time) between an on-board antennal of the vehicle radio set and a railroad antenna of the wayside radio set is measured, to detect a train location, so that train control is performed on the basis of the detected train location.

As a train control system using such a radio distance measuring method, conventionally, for example, a technique including: wireless train position detecting unit that detects a train location on a predetermined track on the basis of a propagation time of a radio wave between a vehicle radio set mounted on a train traveling on the predetermined track and a ground radio set disposed at a predetermined location on the ground; a travel distance calculating unit that calculates a travel distance of the train on the predetermined tack on the basis of an output signal of a speed tachometer connected to an axle of the train; a temporary reference location setting unit that sets the train location detected by the wireless train location detecting unit as a predetermined temporary reference location; and train location detection calculating unit that detects a train location on the predetermined track on the basis of the temporary reference location set by the temporary reference location setting unit and on the basis of the travel distance calculated by the travel distance calculating unit has been disclosed (refer to, for example, Japanese Laid-open (Kokai) Patent Application Publication No. 2007-331629).

Except for the drive mode by the radio distance measuring system like the conventional technique, for example, there is a drive mode by a system of ATS-P or the like. In a track in which different railroad companies mutually operate or the like, a train control has to be performed in different drive modes according to each section of the tracks. In such a case, on-board devices adapted to the drive modes are mounted in trains, and an on-board device to be used is switched by a switch.

However, since a plurality of on-board devices has to be mounted, there are problems such that the cost increases and installation positions have to be assured.

SUMMARY OF THE INVENTION

The present invention has been made in view of the above-mentioned problem, and an object of the present invention is to provide a train control system capable of controlling a train in a plurality of drive modes by a single on-board device.

In order to achieve the above object, an aspect of the present invention provides a train control system according to claim 1, including: an on-board device that is mounted on a train traveling on a predetermined track; a plurality of processing units that is provided in the on-board device and simultaneously performs processes in different drive modes; and a drive mode determining unit that selects either one of process results of processing units to be used in a travel control.

According to an another aspect of the present invention, according to claim 2, in addition to the features of claim 1, one of the drive modes is a continuous ATP (Automatic Train Protection) drive mode by a continuous ATP system and the processing unit is a continuous ATP processing unit. The continuous ATP system includes a vehicle radio set mounted on the train, wayside radio sets each of which is disposed at a predetermined location on ground to transmit information to and receive information from the vehicle radio set, and a ground device that is connected to the wayside radio sets to transmit and receive information. The ground device detects a train location on the basis of wireless propagation time between the vehicle radio set and the wayside radio set, and transmits it to the continuous ATP processing unit in the on-board device, and the continuous ATP processing unit generates a speed pattern on the basis of train location information.

According to a further aspect of the present invention, according to claim 3, in addition to the features of claim 1, one drive mode is an intermittent ATP drive mode by the intermittent ATP system, the processing unit is an intermittent ATP processing unit. The intermittent ATP system includes an on-board coil that is mounted on the train and a ground coil that is disposed at a predetermined location on the ground. The intermittent ATP processing unit generates a speed pattern obtained based on a speed limit of the train, on the basis of information obtained by electromagnetic coupling of the on-board coil and the ground coil.

According to a further aspect of the present invention, according to claim 4, the train control system further includes a change-over switch of a drive mode, that is installed in the driver's cab of the train and switches selection of any of the processing units by the drive mode determining unit, and the change-over switch has a lock mechanism for locking the change-over switch unless a predetermined condition is satisfied.

According to a further aspect of the present invention, according to claim 5, in addition to the features of claim 4, a lock release condition of the lock mechanism is that a master controller of the driver's cab is in an emergency brake position and the train stops.

According to a further aspect of the present invention, according to claim 6, in addition to the features of claim 4, the lock release condition of the lock mechanism is that each drive mode is processed by the processing unit and a speed pattern is generated by each of the processing units.

According to a further aspect of the present invention, in addition to the features of claim 1, the drive mode determining unit automatically switches selection of the processing units in accordance with a section of the track in which the train travels.

According to a further aspect of the present invention, in addition to the features of claim 2, the drive mode determining unit makes a setting so as to perform a process in a drive mode by the continuous ATP processing unit as a normal mode.

According to the embodiment of the invention according to claim 1, the on-board device is provided with the plurality of processing units simultaneously performing processes in different drive modes, and the drive mode determining unit that selects either one of process results of processing units to be used in a travel control. Thus, only by installing a single on-board device, the system can correspond to the plurality of drive modes. It is unnecessary to mount a plurality of on-board devices like in a conventional technique. Therefore, the cost can be reduced and it is unnecessary to assure places to install a plurality of on-board devices.

According to the embodiment of the invention according to claim 2, one of the drive modes is a continuous ATP drive mode by the continuous ATP system, and the processing unit is a continuous ATP processing unit. The ground device detects a train location on the basis of wireless propagation time between the vehicle radio set and the wayside radio set, and transmits it to the continuous ATP processing unit in the on-board device, and the continuous ATP processing unit generates a speed pattern on the basis of train location information. Thus, the train can be controlled by the drive mode by the continuous ATP system.

According to the embodiment of the invention according to claim 3, one drive mode is an intermittent ATP drive mode by the intermittent ATP system, and the processing unit is an intermittent ATP processing unit. The intermittent ATP processing unit generates a speed pattern obtained based on a speed limit of the train, on the basis of information obtained by electromagnetic coupling of the on-board coil and the ground coil. Therefore, a train can be controlled in the drive mode by the intermittent ATP system.

According to the embodiment of the invention according to claim 4, the train control system further includes a change-over switch of a drive mode, that is installed in the driver's cab of the train and switches selection of any of the processing units by the drive mode determining unit, and the change-over switch has a lock mechanism for locking the change-over switch unless a predetermined condition is satisfied. Therefore, the drive mode can be reliably prevented from being switched by mistake during travel of a train, uncontrollability of a train can be reliably prevented, and safe operation of a train can be assured.

According to the embodiment of the invention according to claim 5, a lock release condition of the lock mechanism is that a master controller of the driver's cab is in an emergency brake position and the train stops. Therefore, the lock mechanism can be reliably canceled in a state where the train stops.

According to the embodiment of the invention according to claim 6, the lock release condition of the lock mechanism is that each drive mode is processed by the processing unit and a speed pattern is generated by each of the processing units. Therefore, in the case in which the travel control of a train in each of the drive modes is possible, the lock by the lock mechanism can be reliably released.

According to an embodiment of the invention the drive mode determining unit automatically switches selection of the processing units in accordance with a section of the track in which the train travels Thus, without troubling the driver, a mistake of selection by each of the processing units or the like can be also prevented.

According to an embodiment of the invention the drive mode determining unit makes a setting so as to perform a process in a drive mode by the continuous ATP processing unit as a normal mode. Therefore, it is sufficient to switch the drive mode only in the case of performing a control on a train in a drive mode other than the drive mode by the continuous ATP processing unit.

DESCRIPTION OF THE PREFERRED EMBODIMENTS

Hereinbelow, an embodiment of the present invention will be described with reference to the accompanying drawings.

Figure 1:
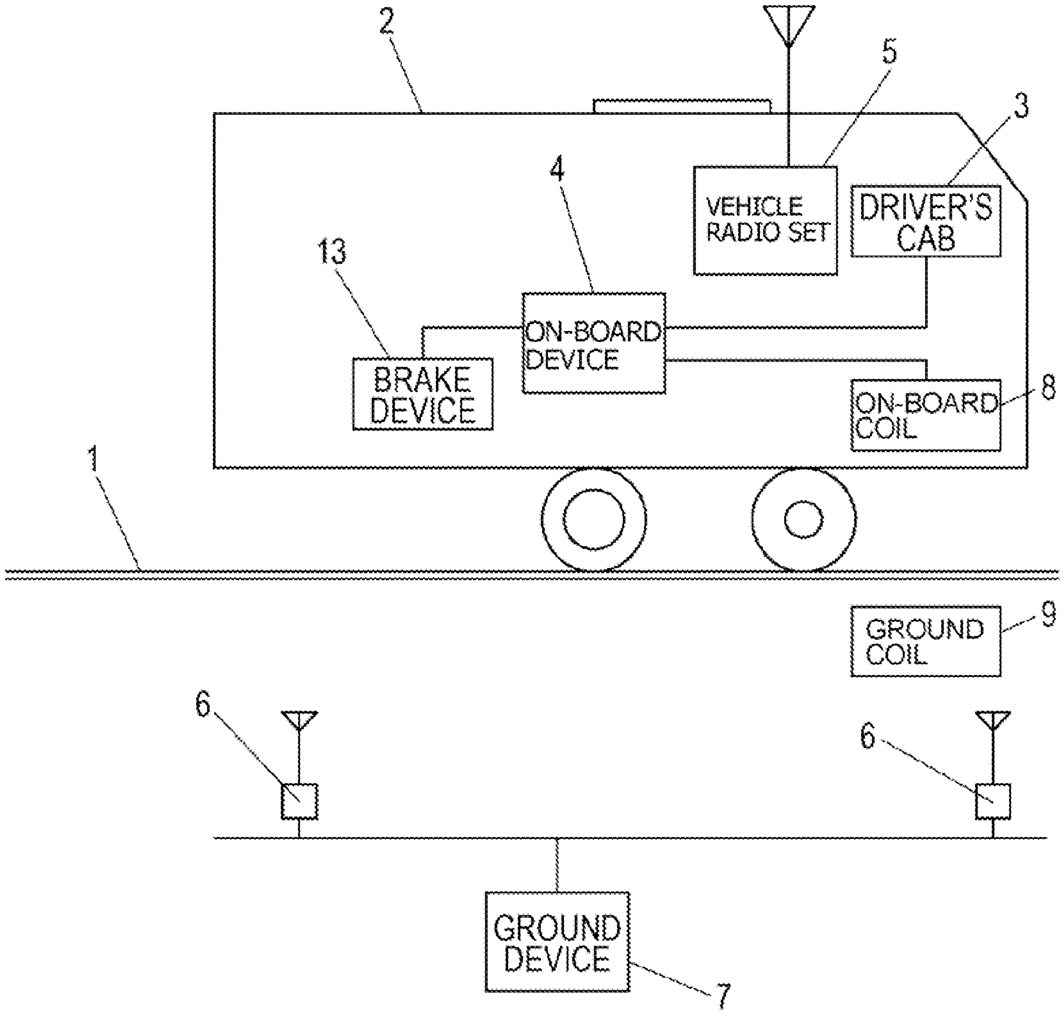
FIG. 1 is a schematic configuration view illustrating a train part in an embodiment of a train control system according to the present invention.
Figure 2:
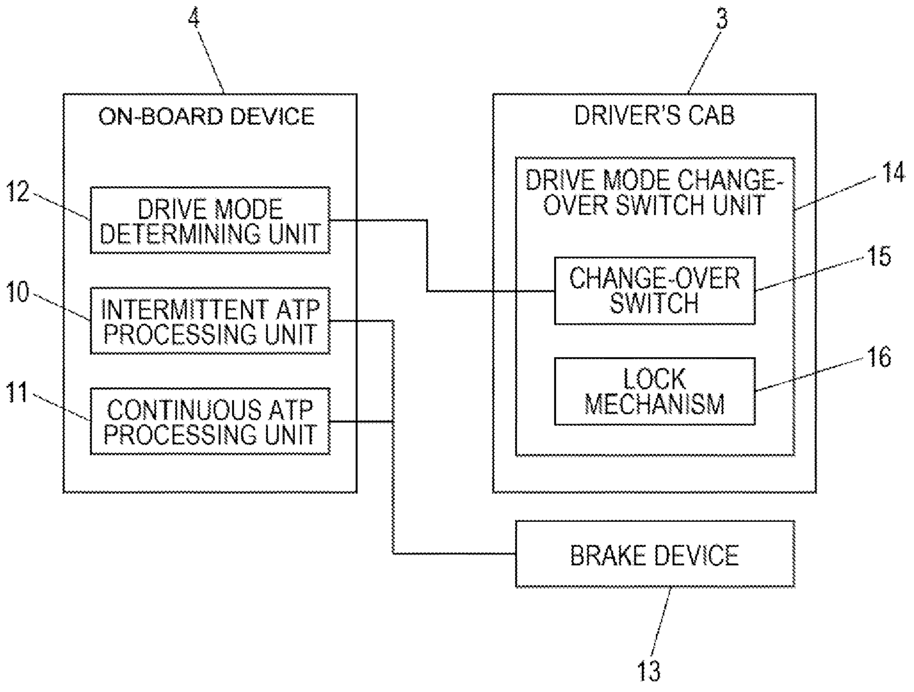
FIG. 2 is a schematic configuration view illustrating details of an on-board device part in the embodiment of the train control system according to the present invention.

FIGS. 1 and 2 are schematic configuration views illustrating an embodiment of a train location detecting system according to the present invention. In the embodiment, a driver's cab 3 in which the driver performs various operations is installed in a train 2 traveling on a predetermined track 1, and an on-board device 4 that controls the train 2 on the basis of an operation of the driver's cab 3 is mounted. The on-board device 4 is configured to perform various controls such as a speed control and a braking control on the train 2. In the train 2, a vehicle radio set 5 connected to the on-board device 4 is also mounted.

A plurality of wayside radio sets 6 that transmits information to and receives information from the vehicle radio set 5 are installed at predetermined intervals along the track 1 of the train 2, and a ground device 7 is connected to the wayside radio sets 6. The ground device 7 calculates distance between the wayside radio set 6 and the train 2 by measuring communication time at the time of performing communication between the wayside radio set 6 and the vehicle radio set 5, and detects the location of the train 2 at that time. The ground device 7 transmits information of a speed limit and a possible travel distance obtained based on train location information via the wayside radio set 6 and the vehicle radio set 5, and the on-board device 4 generates a speed pattern in accordance with the braking performance of the train 2 on which the on-board device 3 is mounted, and performs a travel control of the train 2 on the basis of the speed pattern. A continuous ATP system by radio distance measurement includes the on-board device 4, the vehicle radio set 5, the wayside radio set 6, and the ground device 7. By the continuous ATP system, a continuous ATP operation mode can be performed.

An on-board coil 8 connected to the on-board device 4 is mounted in the train 2, and ground coils 9 are installed at predetermined intervals at predetermined locations in the track 1 of the train 2. When the on-board coil 8 and the ground coil 9 are electromagnetically coupled during traveling of the train 2, the on-board device 4 obtains predetermined speed limit information. The on-board device 4 generates a speed pattern on the basis of the information from the ground coil 9 and performs travel control on the train 2 on the basis of the speed pattern. An intermittent ATP system by ATS-P includes the on-board device 4, the on-board coil 8, and the ground coil 9. By the intermittent ATP system, an intermittent ATP operation mode can be performed.

In the embodiment, as illustrated in FIG. 2, the on-board device 4 is provided with an intermittent ATP processing unit 10 that performs a calculating process of an intermittent ATP system and a continuous ATP processing unit 11 that performs a calculating process of a continuous ATP system. In a state in which information from the ground coil 9 or information from the wayside radio set 6 is transmitted, the intermittent ATP processing unit 10 and the continuous ATP processing unit 11 are configured to perform a process at the same time. The intermittent ATP processing unit 10 is configured to generate a speed pattern obtained based on the speed limit of the train 2, on the basis of information obtained by electromagnetic coupling from the ground coil 9. The continuous ATP processing unit 11 is configured to generate a speed pattern obtained based on a possible travel distance, on the basis of the information obtained from the vehicle radio set 5.

The on-board device 4 is also provided with a drive mode determining unit 12 for selecting either a process result of the intermittent ATP processing unit 10 or a process result of the continuous ATP processing unit 11. In the embodiment, the intermittent ATP processing unit 10 and the continuous ATP processing unit 11 are configured to always perform a process when information is transmitted from the ground coil 9 or the wayside radio set 6, and use the process result of the processing unit selected by the drive mode determining unit 12. On the basis of the process result of the intermittent ATP processing unit 10 or the continuous ATP processing unit 11 selected by the drive mode determining unit 12, the operation of a brake device 13 is controlled.

The driver's cab 3 is also provided with a drive mode change-over switch unit 14. The drive mode change-over switch unit 14 has a change-over switch 15 and a lock mechanism 16 for locking the operation of the change-over switch 15. As the lock mechanism 16, an electromagnetic lock mechanism 16 or the like is applied. For example, the lock of the lock mechanism 16 can be released only in the case in which a predetermined lock release condition is satisfied, for example, a master controller in the driver's cab 3 is in an emergency brake position and the train 2 is stopped. As another lock release condition, for example, the intermittent ATP processing unit 10 and the continuous ATP processing unit 11 perform processes and generate speed patterns in a continuous ATP drive mode and an intermittent ATP drive mode. In this case, since the speed patterns according to the drive modes are generated, the travel control according to any of the speed patterns can be performed by switching the change-over switch.

Figure 3:
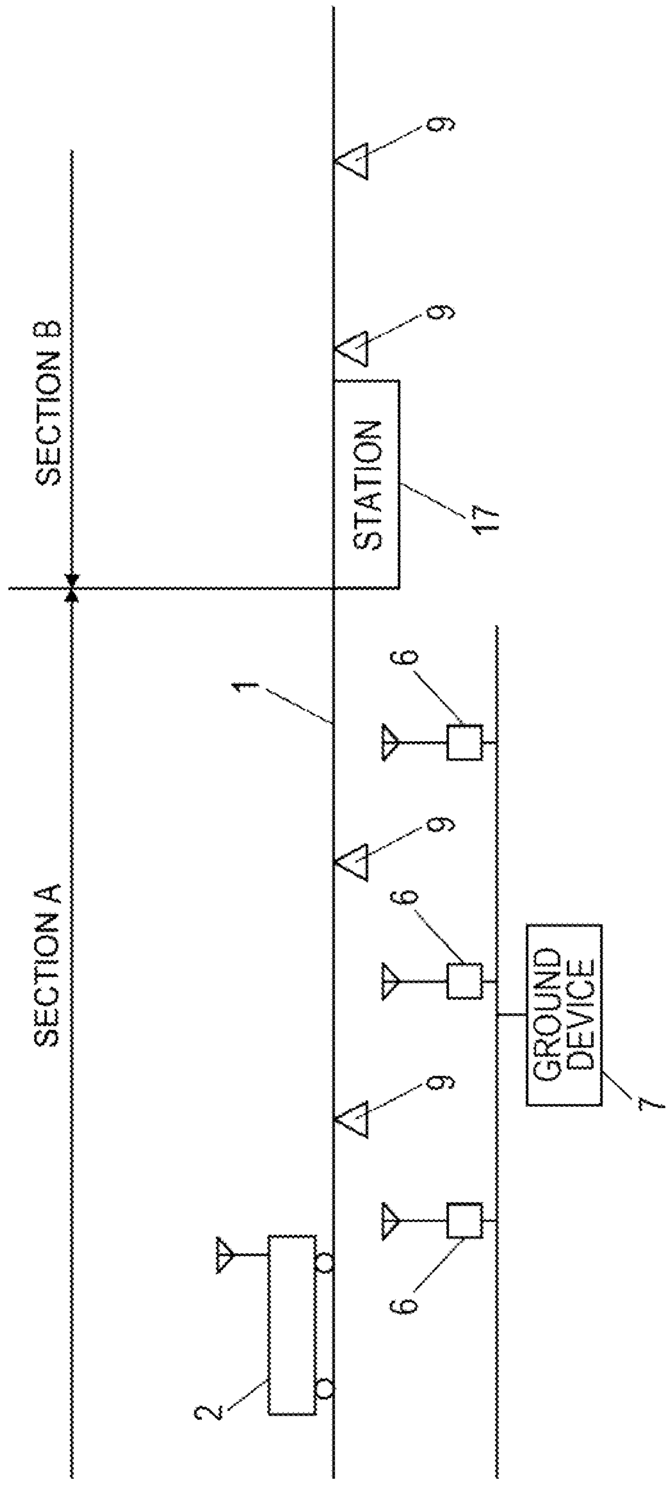
FIG. 3 is an explanatory view illustrating an example of tracks in the embodiment of the train control system according to the present invention.

For example, as illustrated in FIG. 3, in section A in which the ground coils 9 and the wayside radio sets 6 are disposed, switching is made to perform a process in the continuous ATP drive mode by the change-over switch 15, the continuous ATP processing unit 11 is selected by the drive mode determining unit 12, and the brake device 13 is controlled on the basis of a process result of the continuous ATP processing unit 11. In section B in which only the ground coils 9 are positioned after a station 17 in a travelling direction of the train, the lock of the lock mechanism 16 is released when the master controller of the driver's cab 3 is in the emergency brake position and the train 2 is stopped in the station 17, the change-over switch 15 is switched by an operation of the driver to perform a process in the intermittent ATP drive mode, the intermittent ATP processing unit 10 is selected by the drive mode determining unit 12, and the brake device 13 is controlled on the basis of a process result by the intermittent ATP processing unit 10.

In the embodiment, the case in which the intermittent ATP processing unit 10 and the continuous ATP processing unit 11 are manually switched by the change-over switch 15 has been described. For example, in a section in which the wayside radio set 6 and the ground coil 9 are disposed, it may be set to perform a process in the drive mode by the continuous ATP processing unit 11 as a normal mode, and, as necessary, to switch the drive mode by the continuous ATP processing unit 11 to the drive mode by the intermittent ATP processing unit 10. On the contrary, it may be set to preferentially perform a process in the drive mode by the intermittent ATP processing unit 10 as the normal mode. Furthermore, it is possible to obtain the location of the train 2 at that time and determine, by the train 2, whether the train 2 travels in the section in which the wayside radio sets 6 are disposed or the section in which the ground coils 9 are disposed, thereby automatically switching to perform a process by the continuous ATP processing unit 11 or to perform a process by the intermittent ATP processing unit 10.

Next, the operation of the embodiment will be described.

First, by performing communication between the wayside radio set 6 and the vehicle radio set 5, and by measuring the communication time, the distance between the wayside radio set 6 and the train 2 is calculated by the ground device 7, and the location of the train 2 is detected. The ground device 7 transmits information of a speed limit and a possible travel distance based on the location information of the train 2 via the wayside radio set 6 and the vehicle radio set 5, and the speed pattern of the train 2 is generated by the continuous ATP processing unit 11 of the on-board device 4.

On the other hand, the on-board coil 8 and the ground coil 9 are electromagnetically coupled during travel of the train 2, the on-board device 4 obtains predetermined speed limit information, and a speed pattern is generated on the basis of the information from the ground coil 9 by the intermittent ATP processing unit 10 of the on-board device 4.

By switching the change-over switch 15 in accordance with the section in which the train 2 travels, the operation of the brake device 13 is controlled on the basis of the process result of the continuous ATP processing unit 11 or the intermittent ATP processing unit 10.

In the case of switching the drive mode when the section changes or the like, when the master controller of the driver's cab 3 is in the emergency brake position and the train 2 is in a stop state, the lock of the lock mechanism 16 is released. By operating the change-over switch 15, the drive mode can be switched.

As described above, in the embodiment, the on-board device 4 is provided with the continuous ATP processing unit 11 and the intermittent ATP processing unit 10. Processes are performed at the same time by the continuous ATP processing unit 11 and the intermittent ATP processing unit 10, and the change-over switch 15 is switched according to the section in which the train 2 travels, thereby controlling the operation of the brake device 13 on the basis of a process result of the continuous ATP processing unit 11 or the intermittent ATP processing unit 10. Therefore, only by installing a single on-board device 4, the system can be adapted to a plurality of drive modes. Unlike the conventional technique, it is unnecessary to install a plurality of on-board devices 4. The cost can be reduced, and it is unnecessary to assure places for installing a plurality of on-board devices 4.

In the embodiment, the change-over switch 15 is locked by the lock mechanism 16. Only in the case in which the master controller of the driver's cab 3 is in the emergency brake position and the train 2 is in a stop state, the lock of the lock mechanism 16 is released. Thus, the drive mode is not erroneously switched during travel of the train 2. Therefore, for example, when the drive mode is switched to the drive mode by the continuous ATP processing unit 11 in a section in which the wayside radio sets 6 are not disposed, there is a possibility that predetermined information is not transmitted and the train 2 becomes uncontrollable. However, in the embodiment, such a case can be prevented reliably, and safe operation of the train 2 can be assured.

It should be noted that the entire contents of Japanese Patent Application No. 2011-218252, filed on Sep. 30, 2011, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A train control system comprising:

an on-board device, a vehicle radio set, and an on-board coil that are mounted on a train traveling on a predetermined track;

at least one of a plurality of wayside radio sets and a plurality of ground coils that are installed along the track;

a plurality of processing units that is provided in the on-board device and is capable of simultaneously performing processes in different drive modes, wherein the plurality of processing units includes a radio information processing unit configured to generate a speed pattern of the train on the basis of a breaking performance of the train and a possible travel distance of the train obtained via at least one of the plurality of wayside radio sets and the vehicle radio set, and a ground coil information processing unit configured to generate a speed pattern of the train on the basis of a speed limit of the train obtained by electromagnetic coupling of the on-board coil and one of the plurality of ground coils;

a drive mode determining unit that is configured to select either one of the speed pattern generated by the radio information processing unit and the speed pattern generated by the ground coil information processing unit to be used in a travel control of the train; and a change-over switch that is configured to switch selection of the drive mode determining unit by an operation of a driver.

2. The train control system according to claim 1, further comprising:

a ground device connected to the plurality of wayside radio sets to transmit and receive information, wherein the ground device is configured to detect a train location on the basis of a wireless propagation time between the vehicle radio set and the wayside radio set, and to transmit the possible travel distance of the train based on the detected train location to the radio information processing unit via at least one of the plurality of wayside radio sets and the vehicle radio set.

3. The train control system according to claim 1, wherein the change-over switch is installed in a driver's cab of the train and has a lock mechanism for locking the change-over switch unless a predetermined condition is satisfied.

4. The train control system according to claim 3, wherein a lock release condition of the lock mechanism is that a master controller of the driver's cab is in an emergency brake position and the train stops.

5. The train control system according to claim 3, wherein the lock release condition of the lock mechanism is that each drive mode is processed by the processing unit and a speed pattern is generated by each of the processing units.

6. The train control system according to claim 1, wherein the drive mode determining unit is configured to set a drive mode performing a travel control using the speed pattern generated by the radio information processing unit as a normal mode when the train travels in a section of the track in which the plurality of wayside radio sets and the plurality of ground coils are disposed.

* * * * *